(12) United States Patent
Tamura et al.

(10) Patent No.: US 8,287,609 B2
(45) Date of Patent: Oct. 16, 2012

(54) HYDROGEN FORMING APPARATUS, FUEL CELL SYSTEM AND METHOD OF CONTROLLING HYDROGEN FORMING APPARATUS

(75) Inventors: Yoshio Tamura, Hyogo (JP); Kiyoshi Taguchi, Osaka (JP); Yoshikazu Tanaka, Osaka (JP); Shigeki Yasuda, Osaka (JP); Hideo Ohara, Osaka (JP); Naoki Muro, Osaka (JP)

(73) Assignee: Panasonic Corporation, Osaka (JP)

( * ) Notice: Subject to any disclaimer, the term of this patent is extended or adjusted under 35 U.S.C. 154(b) by 755 days.

(21) Appl. No.: 12/375,646

(22) PCT Filed: Apr. 7, 2008

(86) PCT No.: PCT/JP2008/000891
§ 371 (c)(1),
(2), (4) Date: Jan. 29, 2009

(87) PCT Pub. No.: WO2008/126407
PCT Pub. Date: Oct. 23, 2008

(65) Prior Publication Data
US 2009/0291337 A1 Nov. 26, 2009

(30) Foreign Application Priority Data
Apr. 6, 2007 (JP) .................................. 2007-101060

(51) Int. Cl.
*B01J 7/00* (2006.01)
*H01M 8/06* (2006.01)
(52) U.S. Cl. .............................. 48/61; 429/423; 429/427

(58) Field of Classification Search ...... 48/61; 429/423, 429/427
See application file for complete search history.

(56) References Cited

U.S. PATENT DOCUMENTS

| 4,693,945 | A  | * | 9/1987 | Ohyauchi et al. ............. 429/422 |
| 7,045,232 | B1 | * | 5/2006 | Duebel et al. ................. 429/412 |
| 2003/0138688 | A1 | | 7/2003 | Hattori et al. |

(Continued)

FOREIGN PATENT DOCUMENTS

JP 58-150756 10/1983

(Continued)

OTHER PUBLICATIONS

European Search Report issued in European Patent Application No. 08718503 dated Dec. 19, 2011.

*Primary Examiner* — Lore Jarrett
(74) *Attorney, Agent, or Firm* — McDermott Will & Emery LLP

(57) ABSTRACT

A hydrogen generating apparatus including a reformer which performs a reforming reaction using a material and steam to generate hydrogen-containing gas; a water evaporator which generates the steam supplied to the reformer; a first water pathway through which reforming water to be supplied to the water evaporator flows; a pump which supplies the reforming water to the water evaporator $1a$; a second water pathway 7 branching from the first water pathway on the downstream side of the pump; a first water tank to which the water flowing through the second water pathway flows; a first flow rate controller provided on the second water pathway; and a controller which operates the pump and controls the first flow rate controller so that water flows through the second water pathway, thereby stably generating hydrogen and preventing degradation of the reformer thereof is realized.

19 Claims, 7 Drawing Sheets

U.S. PATENT DOCUMENTS

| | | |
|---|---|---|
| 2004/0038095 A1 | 2/2004 | Kushibiki et al. |
| 2005/0153179 A1* | 7/2005 | Ukai et al. ................ 429/22 |
| 2006/0019134 A1 | 1/2006 | Yagi et al. |

FOREIGN PATENT DOCUMENTS

| | | |
|---|---|---|
| JP | 2002-121003 | 4/2002 |
| JP | 2003-14207 | 1/2003 |
| JP | 2004-006093 | 1/2004 |
| JP | 2005-147458 | 6/2005 |
| JP | 2005-259586 | 9/2005 |
| JP | 2006-273619 | 10/2006 |
| JP | 2006-318798 | 11/2006 |

* cited by examiner

HYDROGEN FORMING APPARATUS, FUEL CELL SYSTEM AND METHOD OF CONTROLLING HYDROGEN FORMING APPARATUS

CROSS-REFERENCE TO RELATED APPLICATIONS

This application is a U.S. national phase application of PCT International Patent Application No. PCT/JP2008/000891 filed on Apr. 7, 2008, claiming the benefit of priority of Japanese Patent Application No. 2007-101060 filed on Apr. 6, 2007, all of which are incorporated by reference herein in their entirety.

TECHNICAL FIELD

The present invention relates to a hydrogen generating apparatus which is incorporated in a fuel cell system to generate hydrogen-containing gas, more particularly, to a hydrogen generating apparatus capable of stably supplying reforming water and to a fuel cell system or the like incorporating the hydrogen generating apparatus.

BACKGROUND ART

A fuel cell system is a system in which a material containing an organic compound composed of at least carbon and hydrogen, such as city gas and LPG, is subjected to a steam-reforming reaction to generate hydrogen-containing gas in a hydrogen generating apparatus having a reforming section therein and the generated hydrogen-containing gas is supplied to a fuel cell to generate power.

The material and water are required to perform the steam-reforming reaction. The supply amount of water with respect to the supply amount of the material supplied to the reforming section is herein represented by the steam/carbon ratio (hereafter referred to as S/C). For example, in the case that the material is city gas consisting primarily of methane, the S/C is generally required to be approximately 2.5; if the ratio is smaller than that, the steam-reforming reaction cannot be advanced sufficiently, and the amount of hydrogen to be generated is reduced.

If the amount of hydrogen is reduced, a sufficient amount of hydrogen required for a fuel cell cannot be supplied, and the fuel cell cannot generate power. Furthermore, if the S/C to be supplied to the reforming section is reduced, problems occur, a reforming catalyst is degraded, the carbon component contained in the material precipitates, attaches to the reforming catalyst and lowers the performance of the catalyst, and a gas pathway is clogged due to the precipitation of carbon, whereby the pressure loss in the gas pathway increases and a predetermined amount of the material cannot be supplied.

Moreover, the hydrogen-containing gas obtained after the steam-reforming reaction contains approximately 10% of carbon monoxide and the carbon monoxide poisons the anode electrode of the fuel cell; hence, to reduce the concentration of the carbon monoxide, in the hydrogen generating apparatus, a transforming section which performs a transforming reaction is provided subsequent to the reforming section which performs the steam-reforming reaction. The transforming reaction is a reaction in which water and carbon monoxide are transformed into hydrogen and carbon dioxide by the transforming reaction, whereby carbon monoxide is reduced by the reaction.

Still further, if the S/C to be supplied to the hydrogen generating apparatus is reduced, the water to be used for the transforming reaction is also reduced, whereby the carbon monoxide to be reduced by the transforming reaction is also reduced. As a result, the concentration of the carbon monoxide in the hydrogen-containing gas to be supplied to the fuel cell rises, and the anode electrode of the fuel cell is poisoned with the carbon monoxide more significantly.

In the case of a solid polymer fuel cell, it is necessary to reduce the concentration of carbon monoxide to 10 ppm or less, and the hydrogen-containing gas having passed through the transforming section is further subjected to a selective oxidation reaction using oxidative gas, such as air, in a selective oxidation section. Even in this case, if carbon monoxide is not reduced sufficiently in the transforming section, the concentration of the carbon monoxide after the selective oxidation cannot be reduced to 10 ppm or less.

For these reasons, with respect to water which is supplied to the reforming section (hereafter referred to as reforming water), it is necessary to supply a predetermined amount of the water by which the S/C can be maintained appropriately. Hence, an adjustment is made so that the supply amount of the reforming water stably becomes this predetermined amount by providing a flow rate adjusting instrument in a water pathway which supplies the above-mentioned reforming water. (For example, refer to JP-A-2004-6093.)

DISCLOSURE OF THE INVENTION

Problem to be Solved by the Invention

However, the above-mentioned conventional hydrogen generating apparatus has the following problems.

In the case that air is trapped in a reforming water supplying instrument, such as a pump, which supplies the reforming water, or in the case that the reforming water supplying instrument itself becomes faulty, the above-mentioned predetermined amount of the reforming water cannot be supplied; hence, the S/C to be supplied to the hydrogen generating apparatus is reduced, whereby there occur problems that stable generation of hydrogen-containing gas is prevented in the hydrogen generating apparatus and the reforming catalyst is degraded as described above.

In consideration of the above-mentioned conventional problems, the present invention is intended to provide a hydrogen generating apparatus capable of stably supplying reforming water, stably generating hydrogen-containing gas and suppressing the degradation of a reforming catalyst, and to provide a fuel cell system incorporating the hydrogen generating apparatus.

Means for Solving Problem

A hydrogen generating apparatus according to a first aspect of the present invention made in consideration of the above-mentioned conventional problems is characterized by comprising a reformer which performs a reforming reaction using a material and steam to generate hydrogen-containing gas; a water evaporator which generates the above-mentioned steam supplied to the above-mentioned reformer; a first water pathway through which reforming water to be supplied to the above-mentioned water evaporator flows; a first pump which supplies the above-mentioned reforming water to the above-mentioned water evaporator; a second water pathway branching from the above-mentioned first water pathway on the downstream side of the above-mentioned pump or branching from the above-mentioned first water pathway on which the above-mentioned pump is disposed; a first water tank to which the water flowing through the above-mentioned second water pathway flows; a first flow rate controller provided on the above-mentioned second water pathway; and a controller which operates the above-mentioned first pump and controls the above-mentioned first flow rate controller so that water flows through the above-mentioned second water pathway in the case that the above-mentioned reformer does not perform the operation for generating hydrogen-containing gas.

With this configuration, the flowing operation of the reforming water through the second water pathway is performed as necessary; hence, air trapping in the pump is eliminated or the operation check of the pump is performed, and the reforming water can be supplied to the reformer, whereby the reforming water can be supplied stably to the reformer.

In addition, with this configuration, when the reformer does not perform the operation for generating hydrogen-containing gas by a reforming reaction, air trapping in the pump can be eliminated or the operation check of the pump can be performed, whereby the reformer can stably perform the operation for generating hydrogen-containing gas.

Furthermore, with this configuration, air trapping in the pump can be eliminated or the operation check of the pump can be performed before the above-mentioned reforming water is supplied to the above-mentioned reformer; hence, the reformer can stably perform the operation for generating hydrogen-containing gas.

Moreover, the hydrogen generating apparatus according to another aspect of the present invention is characterized by comprising a combustor which heats the above-mentioned reformer and a condenser which condenses the moisture in the combustion exhaust gas discharged from the above-mentioned combustor, and characterized in that the above-mentioned first water tank is a recovery water tank which stores the water condensed in the above-mentioned condenser.

In addition, the hydrogen generating apparatus according to another aspect of the present invention is characterized by comprising a purifier which purifies the water of the above-mentioned first water tank and a second water tank which stores the water purified using the above-mentioned purifier, and is characterized in that the above-mentioned second water tank is a tank which stores the above-mentioned reforming water and that the above-mentioned first water pathway connects the above-mentioned second water tank to the above-mentioned reformer.

Furthermore, the hydrogen generating apparatus according to another aspect of the present invention is characterized by comprising a second flow rate controller provided on the above-mentioned first water pathway and on the downstream side of the above-mentioned first pump, and characterized in that the above-mentioned controller operates the above-mentioned first pump and controls the above-mentioned first flow rate controller and the above-mentioned second flow rate controller so that the above-mentioned reforming water delivered from the above-mentioned first pump flows into the above-mentioned second water pathway.

Still further, the hydrogen generating apparatus according to another aspect of the present invention is characterized in that the above-mentioned first flow rate controller is a first valve, that the above-mentioned second flow rate controller is a second valve, and that the above-mentioned controller performs control to open the above-mentioned first valve and to close the above-mentioned second valve in the case that the operation of the above-mentioned first pump is started.

With this configuration, the reforming water can be supplied stably to the reformer while the air trapping in the pump is eliminated, whereby stable generation of hydrogen-containing gas is made possible in the reformer.

In addition, the hydrogen generating apparatus according to another aspect of the present invention is characterized in that the above-mentioned controller performs the above-mentioned control during a start-up process.

Furthermore, the hydrogen generating apparatus according to another aspect of the present invention is characterized in that the above-mentioned controller performs the above-mentioned control during a shutdown process.

Moreover, the hydrogen generating apparatus according to another aspect of the present invention is characterized in that the above-mentioned controller performs the above-mentioned control during the standby state.

In addition, the hydrogen generating apparatus according to another aspect of the present invention is characterized in that the above-mentioned first flow rate controller is disposed above the above-mentioned first pump.

With this configuration, the air purged from the pump is apt to be discharged easily from the first flow rate controller owing to buoyancy.

Further, the hydrogen generating apparatus according to another aspect of the present invention is characterized by comprising a first water level sensor which detects the water level of the above-mentioned first water tank and an abnormality detector which detects abnormality in the above-mentioned pump on the basis of the change in the water level detected using the above-mentioned first water level sensor during the above-mentioned control.

With this configuration, the reforming water can be supplied to the reformer after it is confirmed that the pump is not abnormal, whereby stable supply of the reforming water to the reformer is made possible.

Still further, the hydrogen generating apparatus according to another aspect of the present invention is characterized by comprising a second water level sensor which detects the water level of the above-mentioned second water tank and an abnormality detector which detects abnormality in the above-mentioned pump on the basis of the change in the water level detected using the above-mentioned second water level sensor during the above-mentioned control.

With this configuration, the reforming water can be supplied to the reformer after it is confirmed that the pump is not abnormal, whereby stable supply of the reforming water to the reformer is made possible.

In addition, the hydrogen generating apparatus according to another aspect of the present invention is characterized by comprising a second tank which stores the above-mentioned reforming water flowing through the above-mentioned first water pathway; a third water pathway through which the water supplied from the above-mentioned first tank to the above-mentioned second tank flows; a second pump provided on the above-mentioned third water pathway; a heating device which heats at least one of pathways among the first water pathway on the upstream side of the branch section to the above-mentioned second water pathway, the above-mentioned second water pathway, the above-mentioned third water pathway, the above-mentioned first water tank and the above-mentioned second water tank; and an external temperature detector which detects external temperature, and characterized in that the above-mentioned controller operates the above-mentioned heating device, the above-mentioned first pump and the above-mentioned second pump and controls the above-mentioned first flow rate controller and the above-mentioned second flow rate controller so that the reforming water delivered from the above-mentioned first pump flows into the above-mentioned second water pathway to perform freezing prevention operation in the case that the above-mentioned temperature detector has detected a temperature not more than a predetermined threshold value.

With this configuration, part of the reforming water existing inside the first water pathway and the reforming water inside the second water pathway can be prevented from being frozen.

Furthermore, the hydrogen generating apparatus according to another aspect of the present invention is characterized that the above-mentioned heating device is a heater provided on a predetermined face of a housing accommodating at least the above-mentioned third water pathway, the above-mentioned first water tank and the above-mentioned second tank to perform heating using radiation heat.

Moreover, a fuel cell system according to another aspect of the present invention is characterized by comprising the hydrogen generating apparatus according to one of the above-mentioned aspects of the present invention and a fuel cell which generates power using the hydrogen-containing gas supplied from the above-mentioned hydrogen generating apparatus.

With this configuration, the reforming water is supplied stably to the reformer, and the hydrogen-containing gas is generated stably, whereby the fuel cell can be operated stably.

Further, a method for controlling a hydrogen generating apparatus according to one aspect of the present invention is a method for controlling a hydrogen generating apparatus comprising a reformer which performs a reforming reaction using a material and steam to generate hydrogen-containing gas; a water evaporator which generates the above-mentioned steam supplied to the above-mentioned reformer; a first water pathway through which reforming water to be supplied to the above-mentioned water evaporator flows; a first pump which supplies the above-mentioned reforming water to the above-mentioned water evaporator; a second water pathway branching from the above-mentioned first water pathway on the downstream side of the above-mentioned pump or branching from the above-mentioned first water pathway on which the above-mentioned is disposed; a first water tank to which the water flowing through the above-mentioned second water pathway flows; a first valve provided on the above-mentioned second water pathway; and a second valve provided on the above-mentioned first water pathway, the method being characterized by comprising the step of operating the above-mentioned first pump and performing control to open the above-mentioned first valve and to close the above-mentioned second valve so that the above-mentioned reforming water delivered from the above-mentioned first pump flows into the above-mentioned second water pathway in the case that the above-mentioned reformer does not perform operation for generating hydrogen-containing gas or before the above-mentioned reforming water is supplied to the above-mentioned reformer.

With this configuration, the flowing operation of the reforming water through the second water pathway is performed as necessary; hence, air trapping in the pump is eliminated or the operation check of the pump is performed, and the reforming water can be supplied to the reformer, whereby the reforming water can be supplied stably to the reformer.

The hydrogen generating apparatus according to another aspect of the present invention is characterized in that the above-mentioned controller performs the above-mentioned control before supplying the above-mentioned reforming water for the reforming reaction.

The hydrogen generating apparatus according to another aspect of the present invention is characterized in that the above-mentioned controller performs the above-mentioned control before the above-mentioned reforming water is supplied to the above-mentioned reformer.

The hydrogen generating apparatus according to another aspect of the present invention is characterized in that the above-mentioned controller performs the above-mentioned control during the standby state.

The hydrogen generating apparatus according to another aspect of the present invention is characterized in that the above-mentioned controller performs the above-mentioned control during the shutdown process.

Effect of the Invention

With the present invention, the reforming water is supplied stably to the reformer, whereby stable generation of hydrogen and suppression in degradation of the reforming catalyst is made possible.

Figure 1A:
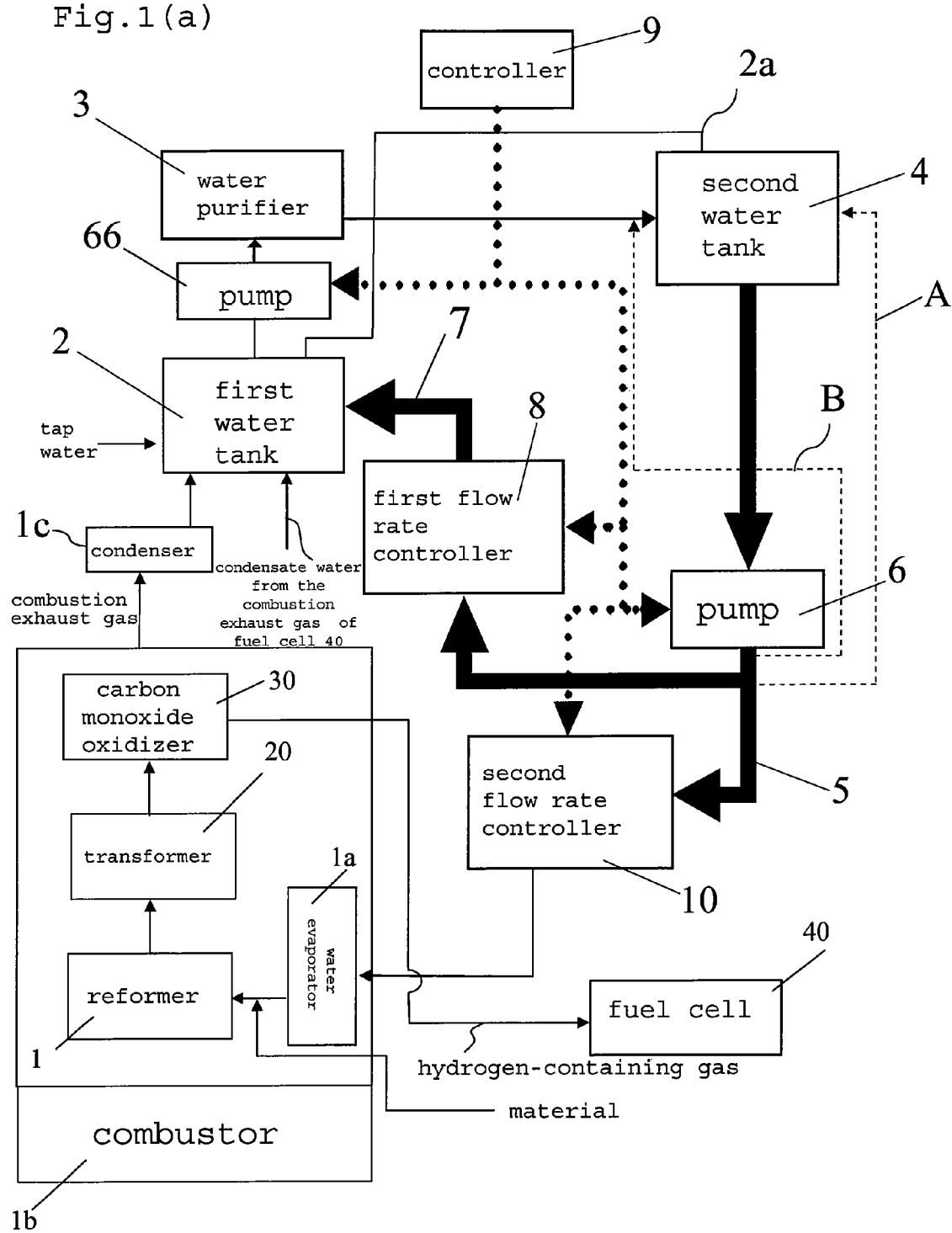
FIG. 1(a) is an exemplary schematic view showing a configuration of a hydrogen generating apparatus according to Embodiment 1 of the present invention.

DESCRIPTION OF THE REFERENCE NUMERALS AND SIGNS 1 reformer
1a water evaporator
1b combustor
1c condenser
2 first water tank
2a overflow pipe
2b opening section
3 water purifier
4 second water tank
5 first water pathway
6, 66, 166, 266 pumps
7 second water pathway
8 first flow rate controller
9 controller
9a abnormality detector
10 second flow rate controller
11 first water level sensor
12 second water level sensor
20 shift converter
30 carbon monoxide oxidizer
40 fuel cell
51, 52 heaters
85 housing
90 flat heater

DETAILED DESCRIPTION

Embodiment 1

Embodiment 1 will be described below referring to the drawings.

FIG. 1(a) is an exemplary schematic view showing a configuration of a hydrogen generating apparatus according to Embodiment 1 of the present invention.

The hydrogen generating apparatus comprises a reformer 1 which subjects a material containing an organic compound containing at least carbon and hydrogen as constituent elements, such as city gas, LPG and kerosene, and steam to a steam-reforming reaction to generate hydrogen-containing gas; a shift converter 20 which performs a shift conversion to reduce carbon monoxide in the hydrogen-containing gas generated using the reformer 1; and a carbon monoxide oxidizer 30 which reduces the concentration of the carbon monoxide in the hydrogen-containing gas having passed through the shift converter 20 to a concentration suited for use in a fuel cell 40. The hydrogen generating apparatus further comprises a water evaporator 1a which generates steam to be supplied to the reformer 1 from water and a combustor 1b which raises the temperature of the reformer 1 to a temperature suited for the steam-reforming reaction. The hydrogen generating apparatus according to this embodiment is configured so that the water evaporator 1a, the shift converter 20 and the carbon monoxide oxidizer 30 are heated by combustion exhaust gas discharged from the above-mentioned combustor 1b. Furthermore, the reformer 1 may use not only the steam-reforming reaction but also for example the autothermal system wherein air is introduced. Moreover, an apparatus which cooperates with the hydrogen generating apparatus according to this embodiment and uses hydrogen is not limited to the fuel cell 40 and may have a configuration in which the shift converter 20 and the carbon monoxide oxidizer 30 are unused and omitted depending on the type of the apparatus to be cooperated. In this embodiment, the concentration of the carbon monoxide in the hydrogen-containing gas having passed through the carbon monoxide oxidizer 30 becomes 10 ppm or less so that hydrogen is used in a solid polymer fuel cell serving as the fuel cell 40.

As shown in FIG. 1(a), for the purpose of generating hydrogen in the reformer 1, it is necessary to supply the material and water, and the stable supply of water will be described in this embodiment. The water to be used for the hydrogen generating apparatus is first stored in a second water tank 4. It is configured that water supplied from an external infrastructure, such as tap water, or water obtained by condensing the moisture in the combustion exhaust gas from the combustor 1b or in the exhaust gas from the fuel cell 40 using a condenser is reused as the water of the second water tank 4.

In the hydrogen generating apparatus according to this embodiment, the moisture in the combustion exhaust gas from the combustor 1b is recovered in a condenser 1c, the recovered water is stored in a first water tank 2, and the water in the first water tank 2 is purified using a water purifier 3 to remove impurities contained in the recovered water inside the first water tank 2 and then supplied to the second water tank 4. The water purifier 3 is equipped with, for example, an active carbon filter and an ion exchange resin, both not shown, and is configured so as to remove impurity ions, such as chlorine ions, and organic substances containing sulfur as a constituent element using the active carbon filter; the type and the order of arrangement of the filter do not matter provided that such impurities in water can be removed.

The purified water stored in the second water tank 4 is supplied to the water evaporator 1a through a first water pathway 5 by operating a pump 6, converted into steam using the water evaporator 1a and then supplied to the reformer 1. The first water tank 2 is open to the atmosphere at its upper end and communicates with the second water tank 4 via an overflow pipe 2a, and it is configured that the water rising above a predetermined level inside the second water tank 4 overflows to the first water tank 2 via this overflow pipe 2a. Hence, the pressures inside the first water tank 2 and the second water tank 4 are maintained at the same pressure as that of the atmosphere.

The ratio of the material and the water, to be supplied separately to the reformer 1, is represented by S/C. For example, in the case that city gas consisting primarily of methane is used as the material, the minimum of the S/C of approximately 2.0 is required for the reforming reaction in the reformer 1; in the case that the steam-reforming reaction is attempted by heating a reforming catalyst in the combustor 1b inside the reformer 1 in a condition wherein the ratio is less than the value, the material is decomposed in the reforming catalyst layer provided inside the reformer 1 or on the downstream side thereof owing to water shortage, and carbon precipitates. If this carbon completely covers the reforming catalyst, the reforming catalyst is degraded, and hydrogen-rich gas cannot be generated.

Furthermore, if the carbon precipitates on the downstream side of the reforming catalyst, the pathway for the hydrogen-containing gas is clogged, and a required predetermined amount of hydrogen-containing gas cannot be supplied to an apparatus (the fuel cell 40 in the case of this embodiment) which uses the hydrogen-containing gas. Moreover, if the pathway for the hydrogen-containing gas is clogged by the carbon precipitation, the pressure loss of the pathway increases, and the pressure required for supplying the material increases. As a result, the power consumption of devices, such as a pump (not shown) which supplies the material, increases, and the efficiency of the hydrogen generating apparatus lowers. Besides, if the amount of the carbon precipitation increases further and if the pressure loss of the gas pathway becomes larger than the capacity of the pump which supplies the material, the material cannot be supplied.

In addition, the steam not used for the reforming reaction in the reformer 1 is used for the shift conversion in the shift converter 20. If the amount of the steam supplied to the shift converter 20 lowers, carbon monoxide cannot be reduced sufficiently by the shift conversion, and the gas becomes unsuited as combustion gas for power generation in the fuel cell 40.

In the case that such combustion gas is supplied to the fuel cell 40, the anode electrode catalyst of the fuel cell 40 is poisoned by the carbon monoxide having not been reduced, and power generation cannot be carried out. Although an amount of steam not used for the reforming reaction out of the steam supplied to the reformer 1 is supplied to the shift converter 20 in this embodiment, the supply of the amount of steam may be carried out separately by causing the water pathway to branch to the reformer 1 in the middle thereof or by using another water pathway.

For the reasons described above, in this embodiment, the pump 6 is controlled so that the S/C of the reforming water to be supplied to the reformer 1 becomes 2.5 to 3.0 in consideration of margin. The optimal range of the S/C may vary depending on the type of the material and the configuration of the hydrogen generating apparatus and therefore is not limited to the above-mentioned range.

Although the configuration and the operation described above may appear similar to those of the conventional technology, as described in the item of the background art, in the prior art of hydrogen generating apparatus in the case that air is trapped in the pump 6, the flow rate of the water to be supplied from the pump 6 to the reformer 1 fluctuates even if the pump 6 is operated in the same capacity as that in the case that no air is trapped. In other words, even in the case that the flow rate of the reforming water to be supplied using the pump 6 is measured using a flow rate detector, such as a flow meter, and the flow rate is fed back to the operation capacity of the pump 6 for example, if air is trapped, the flow rate of the reforming water containing air is eventually measured. As a result, the flow rate detector cannot accurately measure the flow rate of the reforming water itself, and the amount of the water to be supplied from the pump 6 eventually deviates from its target value.

In contrast, this embodiment is characterized in that air bleeding from the pump 6 is performed before the start of the water supply to the reformer 1 during the start-up process of the hydrogen generating apparatus as a countermeasure against air trapping. The configuration and the operation for this purpose will be described below; hence, an embodiment of the control method for the hydrogen generating apparatus according to the present invention will be described.

During air bleeding, a controller 9 controls a first flow rate controller 8 provided on a second water pathway 7 and a second flow rate controller 10 provided on the first water pathway 5 so that the water delivered from the pump 6 passes through the second water pathway 7 branching from the first water pathway 5 on the downstream side of the pump 6 and flows to the first water tank 2.

The above description "the water delivered from the pump 6 passes through the second water pathway 7 and flows to the first water tank 2" does not necessarily indicate that a case in which the whole of the water delivered from the pump 6 flows into the second water pathway 7 but includes a case in which the most of the water delivered from the pump 6 passes through the second water pathway 7 and flows out to the first water tank 2. Hence, although the timing of the above-mentioned air bleeding is set at a time point before the start of water supply to the reformer 1, this time point before the start of water supply indicates a time point before the substantially whole of the water to be delivered from the pump 6, for example, for the purpose of performing the reforming reaction in the reformer 1, passes through the first water pathway 5 and is supplied to the reformer 1. In the case that the most of the water delivered from the pump 6 flows into the second water pathway 7 and that the remainder flows into the first water pathway 5, it is preferable that the amount of the reforming water to be supplied to the reformer 1 through the first water pathway 5 should be a small amount to the extent that the degradation of the reforming catalyst does not advance significantly. The reason for this is that, for example, during the above-mentioned air bleeding, in the case that the temperature of the water evaporator 1*a* is low to the extent that water cannot be evaporated, the reforming water is directly supplied to the reforming catalyst, and water evaporation thus occurs on the reforming catalyst heated to a high temperature; however, if the amount of the reforming water to be directly supplied to the reforming catalyst is large, there is a possibility that the reforming catalyst may be eliminated from the carrier owing to the inflation pressure at the time of water evaporation and may be degraded.

Specifically, valves are used as both the first flow rate controller 8 and the second flow rate controller 10, these valves may be valves, such as needle valves, the opening of which can be adjusted continuously or may be open/close valves in which only one of the open/close states is maintained. In this case, these valves are used and the openings of the valves are controlled so that the pathway resistance of the second water pathway 7 is made smaller than the pathway resistance of the first water pathway 5 on the downstream side of the branch section branching to the second water pathway 7 and so that the water delivered from the pump 6 passes through the second water pathway 7 and flows to the first water tank 2. The valves correspond to the first valve and the second valve of the present invention.

Furthermore, the first flow rate controller 8 and the second flow rate controller 10 are not limited to valves. Any instruments may be used, provided that the instruments have a function capable of making the amount of the water flowing to the first water tank 2 larger than the amount of the water flowing to the reformer 1. For example, pumps or the like may also be used. In the following description, in the configuration shown in FIG. 1(*a*), open/close-operating solenoid valves are used for both the first flow rate controller 8 and the second flow rate controller 10.

The hydrogen generating apparatus according to this embodiment is configured so that the first flow rate controller 8 is opened and the second flow rate controller 10 is closed by the control of the controller 9, whereby the water delivered from the pump 6 flows to only the second water pathway 7.

In this case, the water supplied from the pump 6 is guided to the second water pathway 7 and flows out to the first water tank 2 via the second water pathway 7 by the control of the first flow rate controller 8 and the second flow rate controller 10.

Figure 1B:
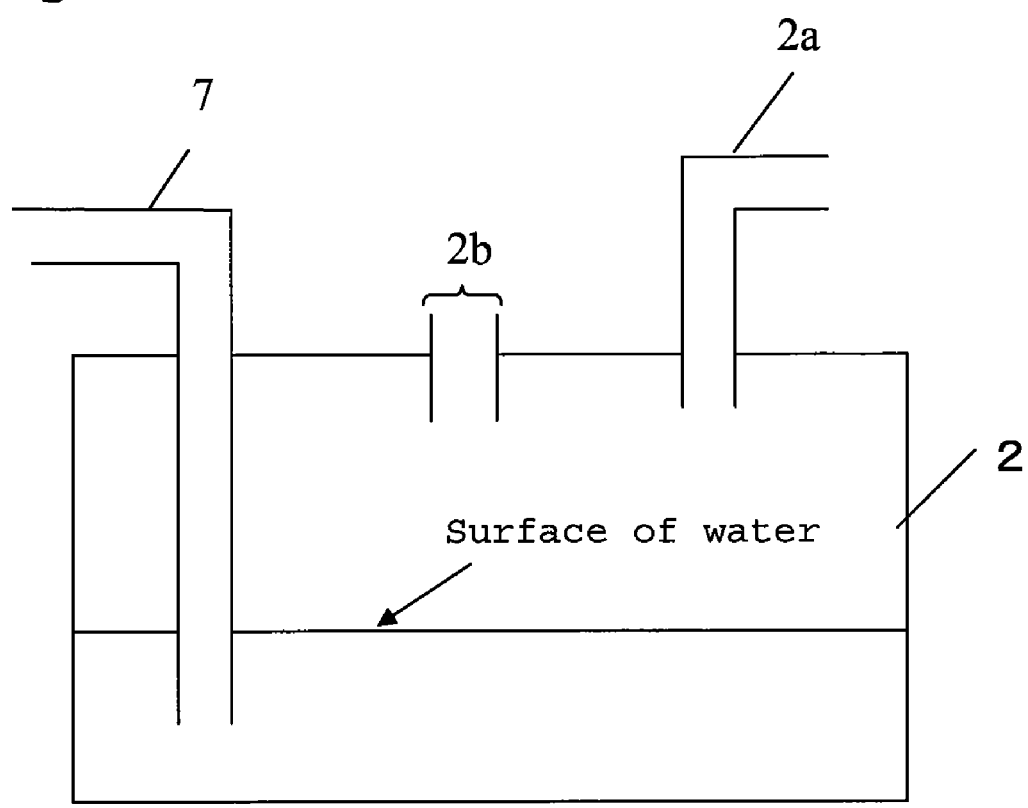
FIG. 1(b) an exemplary schematic view showing the internal configuration of a first water tank 2.

At this time, since the end section of the pipe of the second water pathway 7 is open inside the first water tank 2 as shown in FIG. 1(*b*), the water supplied from the pump 6 is poured into the first water tank 2 together with air; however, since the first water tank 2 is open to the atmosphere at the opening section 2*b* provided in the ceiling section thereof, the air is purged from the first water tank 2 to the outside. When the level of the water inside the second water tank 4 becomes equal to or less than a predetermined level, a pump 66 is driven, and the water inside the first water tank 2 is fed to the water purifier 3, passes through the second water tank 4, the pump 6 and the first flow rate controller 8 and is supplied to the first water tank 2 so that, during the above-mentioned air bleeding, the level inside the second water tank 4 does not become lower than the level at which air is mixed in the pump 6.

The air bleeding is performed from the water guided from the first water tank 2 to the pump 6 by carrying out the above-mentioned operation.

When the above-mentioned air bleeding is performed, it is preferable that the amount of the water delivered from the pump 6 should be larger than the amount of the water supplied when the water supply to the reformer 1 is started. This operation is carried out to facilitate air bleeding from the pump 6.

Furthermore, since the hydrogen generating apparatus according to this embodiment is configured so that the water subjected to the air bleeding flows to the first water tank via the second water pathway 7, the load on the water purifier 3 can be reduced. The reason for this is described below.

The water subjected to the air bleeding may be discharged and abandoned to the outside of the hydrogen generating apparatus; however, in that case, it is necessary that the amount of water equivalent to the abandoned amount should be supplied from an infrastructure, such as tap water. Since the water contains impurities, such as chlorine ions, it is improper to directly supply the water to the hydrogen generating apparatus, and it is eventually necessary to purify the water using the water purifier 3.

In the case of the ion exchange resin used for the water purifier 3 according to this embodiment, its life is approximately 12 liters assuming that tap water is processed; in the case that 10 cc of water is abandoned by one air bleeding operation and that starting is performed once a day, it is supposed that 3650 cc of water should be supplied from the outside. This means that the life of the ion exchange resin is barely 3.3 years for only the air bleeding. This increases the frequency of maintenance of the ion exchange resin, raising the cost of maintenance and resulting in poor economy.

Hence, the hydrogen generating apparatus according to this embodiment is configured so that the water used for the air bleeding is returned to a water purification pathway on which the water purifier 3 is provided. More specifically, the water having been flowing out to the first water tank 2 via the second water pathway 7 passes through the water purifier 3 and is supplied to the second water tank 4 by the operation of the pump 66. Since the water to be supplied to the water purifier 3 has already passed through the water purifier 3 and has become the purified water at this time, the load on the water purifier 3 in this case is lower than that in the case that the water replenished from the infrastructure to the first water tank 2 is introduced into the water purifier 3.

Although the water containing air flows to the first water tank 2 via the second water pathway 7 in the above-mentioned description, it may be configured that the water is supplied to the second water tank 4 without passing through the first water tank 2. More specifically, the water may flow to the second water tank 4 by providing a pipe serving as a water pathway A indicated by a broken line in the figure or the water may be returned to a pipe disposed between the first water tank 2 and the second water tank 4 by providing a pipe serving as a water pathway B indicated by another broken line in the figure. Since the second water tank 4 communicates with the first water tank 2 via the overflow pipe 2a and is open to the atmosphere, air bleeding is possible even if the water inside the second water pathway 7 flows to the second water tank 4. In other words, the second water pathway 7 may have any configuration, provided that it is configured that the air contained in the water flowing out from the water pathway is eventually released via the atmosphere.

Figure 2:
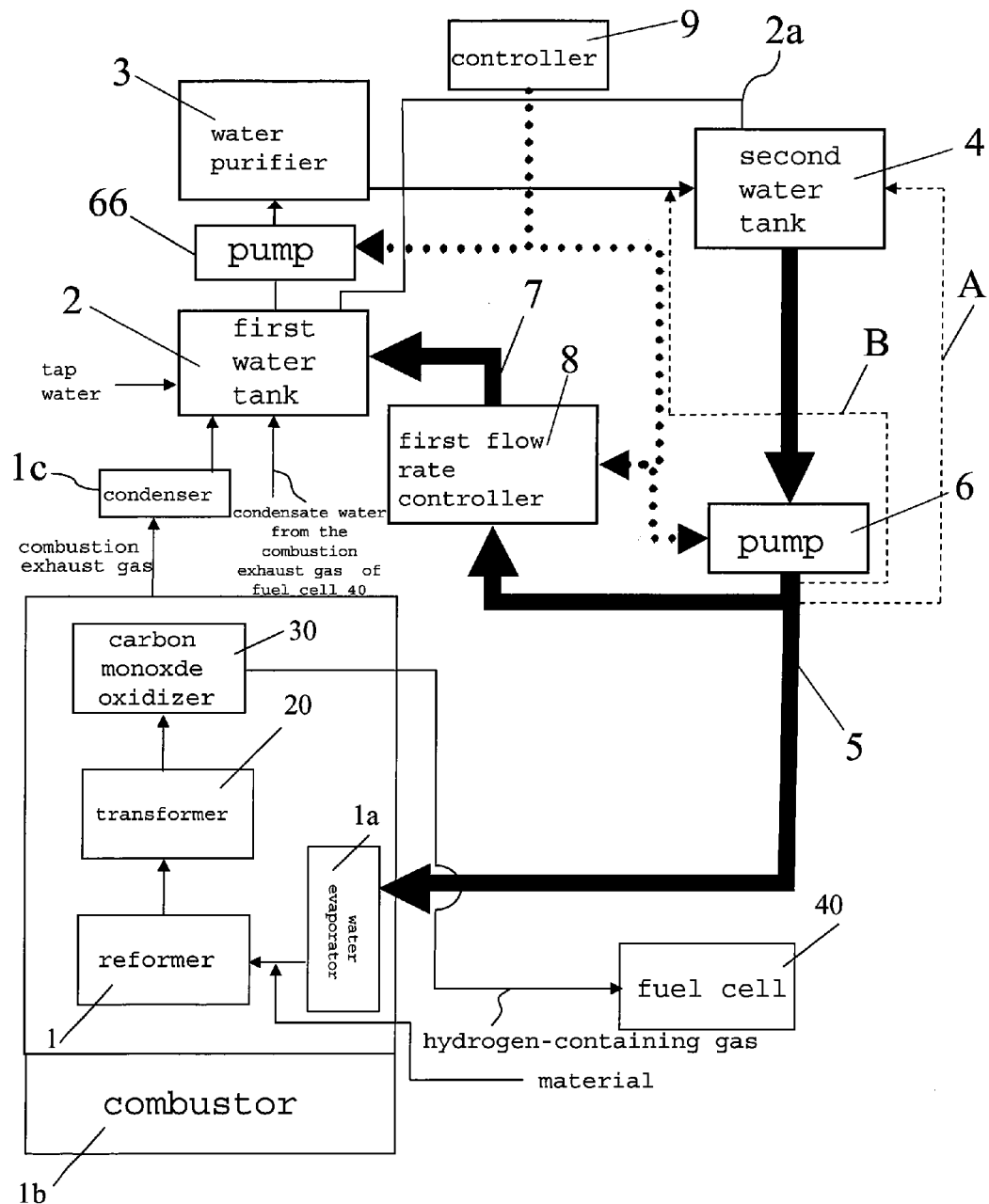
FIG. 2 is an exemplary schematic view showing another configuration of the hydrogen generating apparatus according to Embodiment 1 of the present invention.

Furthermore, it may also be configured that the second flow rate controller 8 is omitted from the first water pathway 5 as shown in FIG. 2. In this case, the controller 9 controls the first flow rate controller 10 so that the amount of the water flowing into the second water pathway 7 during the air bleeding increases; the pathway resistances of the first water pathway 5 and the second water pathway 7 are designed so that the most of the reforming water delivered from the pump 6 flows into the second water pathway 7 at that time. Hence, even if the reforming water is directly supplied to the reforming catalyst during the air bleeding in the case that the temperature of the water evaporator 1a is a low temperature to the extent that water cannot be evaporated, since the amount is very small, the possibility of significantly degrading the reforming catalyst is suppressed even if water evaporation occurs on the reforming catalyst having been heated at a high temperature.

In addition, the amount of the water to be supplied to the reformer 1 should be in an appropriate range in view of the S/C (S/C=2.5 to 3.0). The reason for this is that if a large amount of water is supplied to the reformer 1, a large amount of water evaporates in the water evaporator 1a and condenses and accumulates on the catalysts and the pathways inside shift converter 20 and the carbon monoxide oxidizer 30 having a control temperature lower than that of the reformer 1, thereby causing problems, for example, that the catalysts are degraded and that the pathways are clogged with dew condensation water and the gas is difficult to circulate. Furthermore, in the case that the capacity of the water evaporator 1a connected to the reformer 1 is low with respect to the amount of water to be supplied, the water evaporator 1a is excessively cooled by the water, and there is a possibility that a required amount of steam cannot be generated. If this occurs, the carbon in the material precipitates inside the reformer 1, thereby degrading the reformer 1.

Next, the time during which the pump 6 is operated for the air bleeding is set at 30 seconds in this embodiment, although the time is different depending on the amount of the air assumed to be trapped in the pump 6 and the capacity of the pump 6. The time may have any value, provided that air trapping in the pump 6 is resolved; however, it is preferable that the time should be set short to reduce energy consumption and to shorten the starting time.

Moreover, although the timing at which the air bleeding is performed is at a time point before the start of water supply to the reformer 1 during the start-up process of the hydrogen generating apparatus, since the stable supply of the reforming water to the reformer 1 has the largest effect on the function of the hydrogen generating apparatus during the reforming reaction, the air bleeding may be performed during the start operation before the reforming reaction of the reformer 1. For example, in the case of the hydrogen generating apparatus configured so as to purge steam from at least the inside of the reformer 1 before the reforming reaction, the fluctuation in the flow rate of the reforming water during the steam purging does not cause serious technical problems; hence, even if the air bleeding is not performed before the steam purging (that is, before the start of water supply to the reformer 1) and the above-mentioned air bleeding is performed before the reforming reaction to be performed thereafter, an effect which is the object of the present invention is obtained.

Further, as another example of the timing at which the air bleeding is performed may be at a time point during the shutdown process of the hydrogen generating apparatus or at a time point during the standby state between the completion of the shutdown process and the start of the next start-up process. After all, in the hydrogen generating apparatus, the air bleeding may be performed at any desired timing, provided that the operation for generating the hydrogen-containing gas (that is, the reforming reaction) is not performed in the reformer 1. In particular, since the condensation water from the combustion exhaust gas is stored in the first water tank 2 during the operation of the hydrogen generating apparatus, the water temperatures inside the first water tank 2, the second water tank 4 and the water pathways (including the first water pathway 5) connected to these are higher than the room temperature, and the dissolved oxygen in the water is apt to be generated as bubbles relatively easily; hence, it is preferable that the air bleeding should be performed during the shutdown process of the hydrogen generating apparatus rather than during the standby state.

Furthermore, even if the air bleeding is performed at the above-mentioned timing, the temperatures of the water pathways inside the apparatus rise while the hydrogen generating apparatus carries out the normal operation after the completion of the start processing, and there is a possibility that the dissolved oxygen in the water may be eluted and air trapping may occur. Hence, the controller 9 may perform control using a timer or the like, not shown, to automatically perform air bleeding at predetermined times. In this case, a valve capable of adjusting its opening degree is used as at least the first flow rate controller 8, and the controller 9 increases the opening degree of the valve so that the amount of water to be guided to the second water pathway 7 increases; at that time, the operation amount of the pump 6 is controlled so as to become higher than the control operation amount during the normal operation before the air bleeding so that the S/C is maintained at a value equivalent to that obtained before the air bleeding. More specifically, in the case that the operation amount is controlled to a predetermined target operation amount during the normal operation before the air bleeding, an operation amount higher than this target operation amount by 5% is set as a target operation amount for the air bleeding, and the operation amount of the pump 6 is controlled using the controller 9 so as to become this 5% higher operation amount.

Moreover, the first flow rate controller 8 should be disposed at a position higher than that of the pump 6. With this disposition, the air purged from the pump 6 is apt to be discharged easily from the first flow rate controller 8 owing to buoyancy.

As described above, in the hydrogen generating apparatus according to this embodiment, air trapping in the water supplying device (pump) provided in the water pathway through which the reforming water to be supplied to the reformer 1 is suppressed, and an appropriate amount of the reforming water providing an appropriate S/C value is supplied stably to the reformer 1, whereby it is possible to suppress the degradation of the reforming catalyst. Furthermore, in the case that the hydrogen generating apparatus according to this embodiment is used for a fuel cell system, since hydrogen-containing gas is supplied stably to the fuel cell 40 by the hydrogen generating apparatus, stable operation can be carried out.

In the above description, the reformer 1 corresponds to the reformer of the present invention, the water evaporator 1a corresponds to the water evaporator of the present invention, the combustor 1b corresponds to the combustor of the present invention, and the condenser 1c corresponds to the condenser of the present invention. The first water tank 2 corresponds to the first water tank of the present invention. Furthermore, the water purifier 3 corresponds to the water purifier of the present invention, and the second water tank 4 corresponds to the second water tank of the present invention. Moreover, the first water pathway 5 corresponds to the first water pathway of the present invention, the pump 6 corresponds to the pump of the present invention, and the second water pathway 7 and the water pathways A and B correspond to the second water pathway of the present invention. Still further, the first flow rate controller 8 corresponds to the first flow rate controller of the present invention, the second flow rate controller 10 corresponds to the second flow rate controller of the present invention, and the controller 9 corresponds to the controller of the present invention.

In the above-mentioned configuration, it has been explained that the pump 6 is disposed on the first water pathway 5 and on the upstream side of the branch section of the first water pathway 5 and the second water pathway 7; however, the pump may also be provided at the same position as that of the branch section. In other words, it may be configured that the water pathway branches inside the pump 6. After all, the specific disposition thereof is not limited particularly, provided that the configuration is such that the reforming water can be guided to the first water pathway 5 and the second water pathway 7 during the air bleeding.

Embodiment 2

In a hydrogen generating apparatus according to Embodiment 2 of the present invention, the operation of the pump 6 is checked, and if an abnormality occurs, such as seizure at the drive section of the pump 6, the abnormality is detected.

Figure 3:
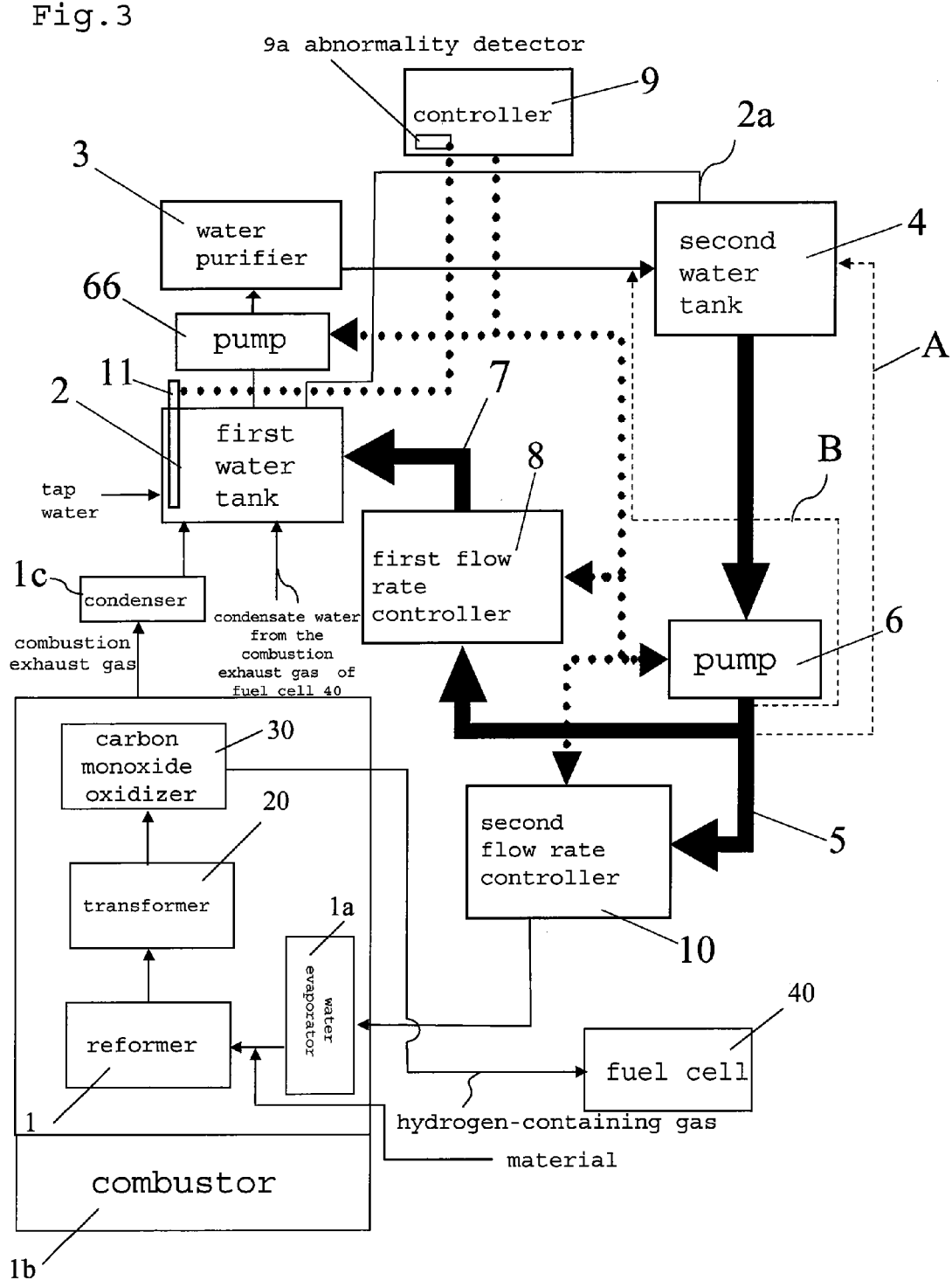
FIG. 3 is an exemplary schematic view showing a configuration of a hydrogen generating apparatus according to Embodiment 2 of the present invention.

FIG. 3 is an exemplary view showing a configuration of the hydrogen generating apparatus according to Embodiment 2 of the present invention. However, the components equivalent or similar to those shown in FIG. 1 or 2 are designated by the same reference codes, and their detailed explanations are omitted.

In the hydrogen generating apparatus according to this embodiment, the first water tank 2 is equipped with a first water level sensor 11 which detects the water level thereof and an abnormality detector 9a which detects abnormality on the basis of the water level detected using the first water level sensor 11, and the controller 9 performs control on the basis of the detection of the abnormality detector 9a. In this embodiment, as the first water level sensor 11, a sensor which is used to control the amount of water in the first water tank is used during the operation of the hydrogen generating apparatus; however, another sensor may be provided separately and independently so as to specialize in only the operation check of the pump 6.

Although various types, such as a float-type water level indicator, an electrode-type water level indicator, an optical water level indicator and a pressure-type water level indicator, are available as the first water level sensor 11, any water level indicators may also be used, provided that they can detect water levels. In this embodiment, a float-type water level indicator is used. Since the float-type water level indicator judges the change in water level on the binary indication, i.e., ON/OFF of a switch, one float-type water level indicator judges whether the pump 6 is not abnormal and can normally supply the reforming water by checking whether the switch is turned from OFF to ON depending on the change in water level. The first water level sensor corresponds to the first water level sensor of the present invention.

The operation of the hydrogen generating apparatus according to Embodiment 2 will be described below.

According to an operation check method for the pump 6, the first flow rate controller 8 and the second flow rate controller 10 are adjusted by the controller 9 while the pump 6 is operated at the operation amount by which a predetermined amount of water is delivered from the pump 6, whereby the water delivered from the pump 6 is wholly allowed to flow to the first water tank 2 via the second water pathway 7. As a result, the water inside the first water tank 2 increases, and the water level detected using the first water level sensor changes (rises).

If this change (rising) in water level is equivalent to the change (rising) caused by the predetermined flow rate corresponding to the operation amount of the pump 6, it can be judged that the pump 6 operates normally, and if the change is a change in water level not corresponding to the above-mentioned predetermined flow rate, it is judged that the pump 6 is seized or faulty and is detected as abnormal. In the case of this embodiment, it is judged that normal operation is performed if the switch of the first water level sensor 11 serving as a float-type water level indicator is turned from ON to OFF by the change in water level corresponding to the operation amount of the pump; however, if the pump 6 is seized or faulty, the actual change in water level caused by the operation amount of the pump is small, and the switch is not turned, and this state is detected as abnormal using the abnormality detector 9a.

In the case of an abnormality, if the hydrogen generating apparatus is kept operating in this state, the hydrogen generating apparatus is degraded and cannot generate normal hydrogen-containing gas; hence, in the case of a configuration in which the operation check of the pump 6 is performed during the start processing of the hydrogen generating apparatus, the controller 9 stops the operation and issues an abnormality alarm using an abnormality alarm apparatus (not shown), for example, and urges the pump 6 to be replaced or repaired. Or in the case of a configuration in which the operation check of the above-mentioned pump 6 is performed during the standby state of the hydrogen generating apparatus, the controller 9 sets the operation of the hydrogen generating apparatus to an unallowable state, issues an abnormality alarm using the abnormality alarm apparatus and does not release the unallowable state until the replacement or repair of the pump 6 is completed; after the replacement or repair of the pump 6 is completed and the abnormality of the pump 6 is eliminated, the operation of the hydrogen generating apparatus is allowed using the controller 9. The unallowable state of the operation of the hydrogen generating apparatus represents a state in which the start processing is not started even if the start conditions of the hydrogen generating apparatus are satisfied.

Furthermore, in the case that water is supplied excessively from the pump 6, this should also be judged as the above-mentioned abnormality using the first water level sensor 11. In the case that one float-type water level indicator is used as the first water level sensor 11, if the pump 6 excessively supplies water, the timing of the above-mentioned turning from ON to OFF becomes faster than that in the case of the normal operation. Hence, in the abnormality detector 9a, the time elapsed from the operation start of the pump 6 to the turning from ON to OFF of the switch of the first water level sensor 11 is measured using a timer or the like, not shown, and compared with the previously recorded time for the normal operation; in the case that the measured time is shorter than the time, it can be judged that the pump 6 has supplied water excessively.

Figure 4:
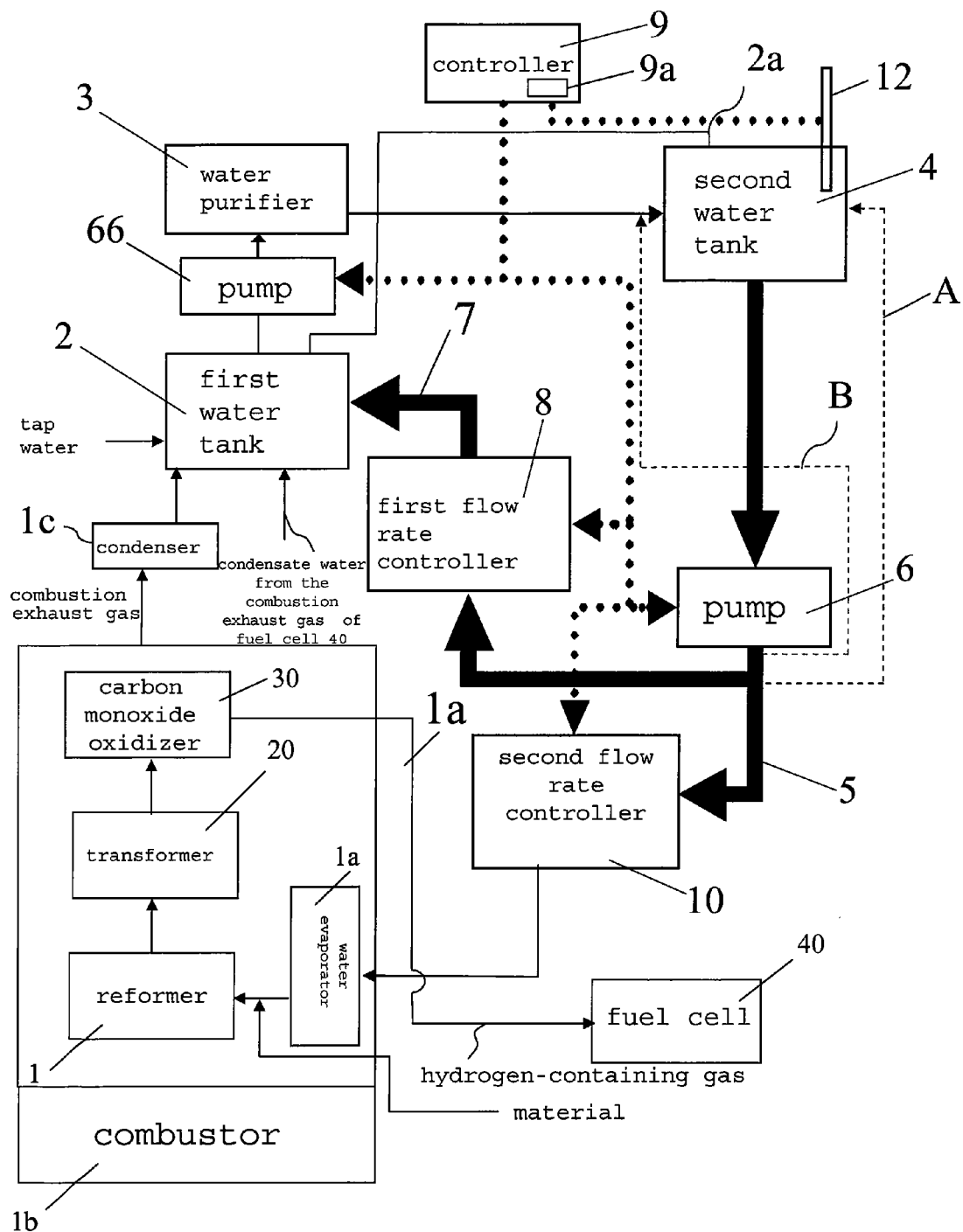
FIG. 4 is an exemplary schematic view showing another configuration of the hydrogen generating apparatus according to Embodiment 2 of the present invention.

As the device which checks the amount of the water delivered from the pump 6, the second water level sensor 12 provided in the second water tank 4 shown in FIG. 4 may also be used instead of the first water level sensor 11. The second water level sensor 12 also uses a water level indicator which controls the water level of the second water tank 4 just like the first water level sensor 11. However, another sensor may be provided separately and independently so as to specialize in the checking of the amount of the water passing through the pump 6. Furthermore, any type may be used as the second water level sensor 12, provided that the sensor can detect the change in water level, just like the first water level sensor 11. A float-type water level indicator is used herein.

As in the case of the first water level sensor, the method for checking the operation of the pump 6 using the second water level sensor is carried out by detecting the change in the water level (level lowering) of the second water tank 4 using the second water level sensor 12 while the pump 6 is operated at the operation amount by which a predetermined flow rate of water is delivered. At this time, the pump 66 is also operated simultaneously at a constant operation amount, whereby control is performed so that the amount of water corresponding to the operation amount of the pump 6 is pumped to the second water tank 4. However, if the water pathway from the first water tank 2 via the water purifier 3 to the second water tank 4 is disposed so as to be able to supply water at the flow rate corresponding to the operation amount of the pump 6, the operation or configuration of the pump 66 may be omitted. The second water level sensor 12 corresponds to the second water level sensor of the present invention.

In this way, a judgment is made as to whether the pump 6 is operating normally by detecting the water level using the second water level sensor 12, and if the pump 6 is not operating normally, this is detected as abnormal. The operation of the hydrogen generating apparatus after the detection of the abnormality is similar to that in the case that the first water level sensor 11 is used.

In the case that the second water pathway of the present invention is connected to the second water tank 4 (corresponding to the water pathway A indicated by the broken line in FIG. 1), water returns via the pump 6 from the second water tank 4 in which the second water level sensor 12 is provided, and the operation check of the pump 6 cannot be performed. For this reason, in the case that the operation check of the pump 6 is performed, the water delivered from the second water pathway of the present invention should be delivered to a location other than the second water tank 4.

Next, the timing at which the operation check of the pump 6 is performed will be described.

Basically, as in the case of the air bleeding in the hydrogen generating apparatus according to Embodiment 1, in the case that the operation (the reforming reaction) for generating hydrogen-containing gas is not carried out in the reformer 1, or before water supply to the reformer is started, the operation check may be performed at any timing.

In this embodiment, the operation check of the pump 6 is performed during the shutdown process of the hydrogen generating apparatus or in the standby state after the completion of the shutdown process. The reason for this is described below. More specifically, a float-type water level indicator having low accuracy in the detection of water level is used as the first water level sensor 11 or the second water level sensor 12 in this embodiment to reduce the cost of the hydrogen generating apparatus; hence, the change in water level cannot be checked unless a large amount of water is passed; therefore, the time required for the operation check of the pump 6 may occasionally become longer than the time from the start of the operation to the start of the supply of the reforming water depending on the temperature condition of the hydrogen generating apparatus immediately before the start of the operation (in the case that the hydrogen generating apparatus is in a high temperature state before the start of the operation, for example, in the case of restart immediately after stop).

Furthermore, the operation check of the pump 6 may also be performed before the reforming reaction is started during the start-up process or before the supply of the reforming water to the reformer 1 is started. In this case, if a sensor having high accuracy in the detection of water level is used as the first water level sensor 11 or the second water level sensor 12, the operation check of the pump 6 can be performed in a short time; hence, the start-up process is started while the hydrogen generating apparatus immediately before the start of the operation is in a high temperature state; this is applicable to a case in which the shifting to the reforming reaction is carried out in a time shorter than the usual time, thereby being preferable. The operation check of the pump 6 during the start processing can be performed to check the state immediately before the reforming reaction is started in the hydrogen generating apparatus if the pump 6 has any abnormality, thereby being preferable to the operation check which is performed during the shutdown process or during the standby state, with respect to securely obtaining the stable operation of the hydrogen generating apparatus.

Moreover, although the first water level sensor 11 or the second water level sensor 12, formed of one float-type water level indicator, is used to judge whether water is supplied or whether the supply is excessive in the above description, if multiple water levels can be measured or if a water level can be measured continuously using multiple float-type water level indicators or an optical water level indicator, the accuracy of judging the operation of the pump 6 can be improved.

Embodiment 3

In a hydrogen generating apparatus according to Embodiment 3 of the present invention, the temperature of the outside is detected, and the water pathways for the recovered water, the purified water, etc. inside the hydrogen generating apparatus, in particular, the pathways including the water pathways from the first water pathway 5 to the second water pathway 7 and the water pathways to the first water tank 2, are prevented from being frozen due to the drop of the external temperature or the like.

Figure 5:
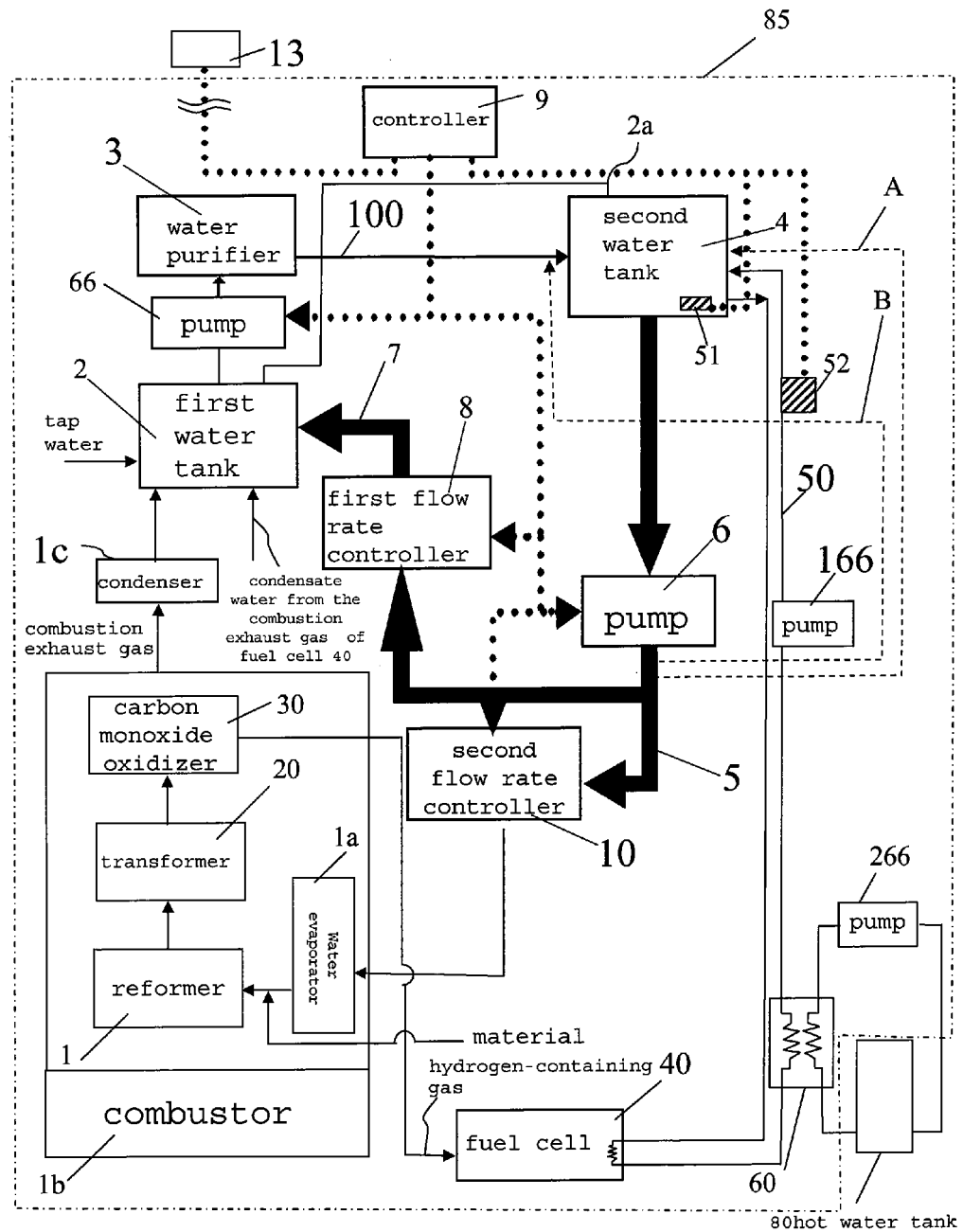
FIG. 5 is an exemplary schematic view showing a configuration of a hydrogen generating apparatus according to Embodiment 3 of the present invention.

FIG. 5 is an exemplary view showing a configuration of a fuel cell system incorporating the hydrogen generating apparatus according to Embodiment 3 of the present invention. However, the components equivalent or similar to those shown in FIG. 1 or 2 are designated by the same reference codes, and their detailed explanations are omitted.

In Embodiment 3, a temperature sensor 13 which detects external temperature is provided at a location which is outside the housing 85 of the fuel cell system and exposed to the external air, and the controller 9 performs control operation on the basis of the temperature detected using the temperature sensor 13.

Although various types, such as a type which uses a thermocouple or a thermistor, are available as the temperature sensor 13, any sensor may be used, provided that it can detect temperature or temperature change and output the result as a signal. A thermocouple sensor is used in this embodiment. The temperature sensor 13 corresponds to the external temperature detector of the present invention.

Furthermore, in Embodiment 3, the fuel cell system comprises a water pipe 50 constituting a first circulation pathway configured so that the water delivered from the second water tank 4 flows and then returns to the second water tank 4 after cooling the fuel cell 40, a pump 166 provided on the water pipe 50, a hot water pipe 70 constituting a second circulation pathway through which the hot water obtained by heat exchanging with the water inside the first circulation pathway using a heat exchanger 60 flows, a pump 266 provided on the hot water pipe 70, and a hot water tank 80 in which the hot water is stored.

The control operation carried out to prevent the fuel cell system incorporating the hydrogen generating apparatus according to Embodiment 3 from being frozen will be described below.

The temperature sensor 13 detects temperature and outputs a signal to the controller 9 as necessary. The controller 9 compares the temperature value indicated by the signal obtained from the temperature sensor 13 with a predetermined value having been set beforehand; in the case that the temperature value becomes equal to or less than the predetermined value, the controller 9 judges that there is a possibility that the water pathways including the pathways from the first water pathway 5 via the second water pathway 7 to the first water tank 2 may be frozen, opens the first flow rate controller 8 and closes the second flow rate controller 10 to allow water to flow to only the first water tank 2, and operates the pump 66, thereby performing control to supply the water of the first water tank 2 to the second water tank 4. Although 3° C. is taken as an example of the predetermined value, a margin of approximately 1 to 2° C. may be provided.

By virtue of the above-mentioned control operation, water circulates through a pathway (a circulation pathway C) ranging from the second water tank 4 via the first water pathway 5, the second water pathway 7, the first water tank 2 and a pathway 100 to the second water tank 4, and water also circulates through a pathway (a circulation pathway D) ranging from the second water tank via the pathway 100, the first water tank 2 and the overflow pipe 2a to the second water tank 4.

Furthermore, it is preferable to carry out heating operation using a heating device which heats at least one of pathways among the first water pathway 5 on the upstream side of the branch section to the second water pathway 7, the second water pathway 7, the water pathway 100 serving as a third water pathway of the present invention, the first water tank 2 and the second water tank 4, together with the above-mentioned water circulation operation. In this case, since the hot water heated using the above-mentioned heating device circulates inside the circulation pathway by the above-mentioned circulation operation, the water inside the water pathway (more specifically, the circulation pathway C) including the first water pathway 5, the second water pathway 7 and the first water tank 2 is prevented from being frozen even if the external temperature lowers. The fuel cell system incorporating the hydrogen generating apparatus according to this embodiment is configured, for example, as shown in FIG. 5, so that the water inside the second water tank 4 is directly heated using a heater 51 provided inside the second water tank 4, whereby hot water flows through the water pathways including the first water pathway 5, the second water pathway 7 and the first water tank 2 to suppress the water inside the water pathways from being frozen even if the external temperature lowers. Furthermore, it may also be configured so that the above-mentioned heater 51 is provided in the first water pathway 5 on the upstream side of the branch section branching to the second water pathway 7, the second water pathway 7, the pathway 100 serving as the third water pathway of the present invention or the first water tank 2 to directly heat the water inside the water pathways.

Moreover, as the heating device which heats the water inside the second water tank 4, a heater 52 provided on the water pipe 50 may also be used instead of the above-mentioned heater 51. In this case, the hot water heated using the heater 52 flows into the second water tank 4 and accumulates inside the second water tank 4. In other words, the heater 52 functions as a heating device which indirectly heats the water inside the second water tank 4.

Further, as the heating device which indirectly heats the water inside the second water tank 4, the heat of the hot water inside the hot water tank 80, obtained by heat exchanging with the fuel cell 40, may also be used instead of the heating by the heater 52. In this case, the water delivered from the second water tank 4 and flowing through the water pipe 50 is heated by heat-exchanging with the hot water accumulating inside the hot water tank 80 using the heat exchanger 60 and then fed back into the second water tank 4, whereby hot water accumulates inside the second water tank 4. In other words, the water inside the second water tank 4 is indirectly heated by the hot water of the hot water tank 80.

Furthermore, as another embodiment of the heating device which indirectly heats the water inside the second water tank 4, the heat of the fuel cell 40 operating to generate power may also be used instead of the heating by the heater 52. In this case, the water delivered from the second water tank 4 and passing through the water pipe 50 is heated by heat-exchanging with the fuel cell and then fed back into the second water tank 4, whereby hot water accumulates inside the second water tank 4. In other words, the water inside the second water tank 4 is indirectly heated by the heat of the fuel cell 40.

Still further, as another embodiment of the heating device which indirectly heats at least one of pathways among the first water pathway 5 on the upstream side of the branch section to the second water pathway 7, the second water pathway 7, the water pathway 100 serving as the third water pathway of the present invention, the first water tank 2 and the second water tank 4, it may also be configured so that at least one of the above-mentioned water pathways is heated by external radiation heat. A specific heating configuration thereof is herein shown in FIG. 6.

Figure 6:
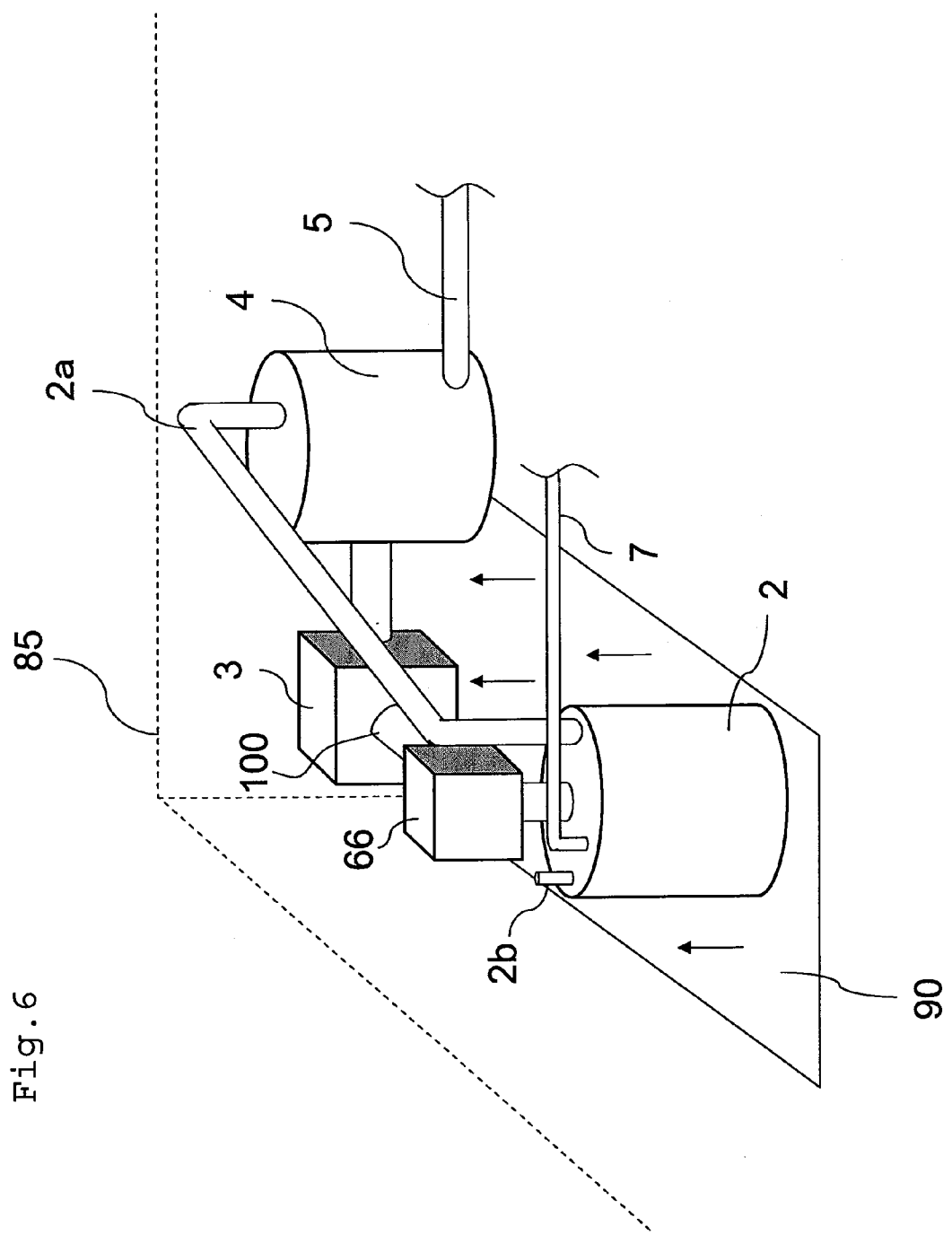
FIG. 6 is an exemplary schematic view showing another configuration of the hydrogen generating apparatus according to Embodiment 3 of the present invention.

FIG. 6 is an exemplary schematic perspective view showing a state inside the housing 85 of the fuel cell system incorporating the hydrogen generating apparatus; the components equivalent or similar to those shown in FIGS. 1 to 5 are designated by the same reference codes, and their detailed explanations are omitted. In addition, a flat heater 90 is embodied using a metal plate disposed in the housing 85 on a face lower than the position in which the second water tank 4 is disposed and provided with a heating element, not shown, disposed away from the metal plate. As shown in FIG. 6, the flat heater 90 indirectly heats the water inside the pathway 100 including the pump 66 and the water purifier 3 using the radiation heat radiating in the direction indicated by upward arrows in the figure, the water (hot water) heated by the above-mentioned circulation operation circulates in the circulation pathway C, whereby the water inside the water pathways including the first water pathway 5, the second water pathway 7 and the first water tank 2 is prevented from being frozen.

Although the flat heater 90 shown in FIG. 6 is provided on the bottom section of the housing 85, it may also be provided on a side face of the housing 85 or on the ceiling thereof. After all, if at least one of pathways among the first water pathway 5 on the upstream side of the branch section to the second water pathway 7, the second water pathway 7, the water pathway 100 serving as the third water pathway of the present invention, the first water tank 2 and the second water tank 4 can be heated by radiation heat from the outside, the layout is not limited to that of this embodiment.

In the above description, the temperature sensor 13 corresponds to the external temperature detector of the present invention, the second water tank 4 corresponds to the second water tank of the present invention, and the pathway 100 connecting the first water tank 2 via the pump 66 and the water purifier 3 to the second water tank 4 corresponds to the third water pathway of the present invention. Furthermore, the pump 66 corresponds to the second pump of the present invention. Moreover, the heater 51 corresponds to an example of the heating device of the present invention. Besides, the heater 52 and the water pipe 50 and the pump 166 serving as the first circulation pathway also correspond to examples of the heating devices of the present invention. In addition, when the fuel cell 40 generates power, the fuel cell 40 and the water pipe 50 and the pump 166 serving as the first circulation pathway also correspond to examples of the heating devices of the present invention. Further, the configuration comprising the heat exchanger 60, the hot water pipe 70 and the pump 266 serving as the second water pathway and the hot water tank 80 correspond to examples of the heating devices of the present invention. Still further, the flat heater 90 also corresponds to an example of the heating device of the present invention.

Although the fully equipped configuration is shown in FIG. 5 as an example of the heating devices of the present invention described above, a heating device which heats at least one of pathways among the first water pathway 5 on the upstream side of the branch section to the second water pathway 7, the second water pathway 7, the water pathway 100 serving as the third water pathway of the present invention, the first water tank 2 and the second water tank 4 may be provided as the heating device of the present invention; additionally, not only the heating device which directly heats the water inside a specific pathway but also the heating device which indirectly heats the water are also included as the heating devices as described above.

Furthermore, although the temperature sensor 13 is provided outside the housing 85 so that the external temperature can be detected directly as described above, it may also be provided at a location in which the temperature changes depending on the external temperature and the external temperature can be detected indirectly. More specifically, during the operation stop of the fuel cell system incorporating the hydrogen generating apparatus, in which antifreezing operation is necessary, the temperature sensor 13 may be provided at any desired location inside the housing 85 since the temperature changes depending on the external temperature at any location inside the housing 85. For example, the temperature sensor may be provided in the space inside the housing 85 or in a water pathway inside the housing 85, such as the first water pathway 5, the second water pathway 7, the first water tank 2, the second water tank 4, the pathway 100.

In the respective embodiments described above, the hydrogen generating apparatus described above is connected to the fuel cell system, and the hydrogen-containing gas generated in the hydrogen generating apparatus is used as fuel gas to generate power in the fuel cell system; however, the present invention may also be embodied as a fuel cell system in which a fuel cell is incorporated in the hydrogen generating apparatus.

INDUSTRIAL APPLICABILITY

The present invention has effects capable of stably supplying reforming water, stably generating hydrogen-containing gas and suppressing the degradation of a reforming catalyst and is applicable to various apparatuses in which hydrogen is used, thereby being useful as a household fuel cell system or the like, for example, when connected to a fuel cell system.

The invention claimed is:
1. A hydrogen generating apparatus comprising:
a reformer which performs a reforming reaction using a material and steam to generate hydrogen-containing gas;
a water evaporator which generates said steam supplied to said reformer;
a first water pathway through which water to be supplied to said water evaporator flows;
a first pump which supplies the water to said water evaporator;
a second water pathway branching from said first water pathway on a downstream side of said first pump or branching from said first water pathway on which said first pump is disposed;
a first water tank, the water which flows through said second water pathway flows into the first water tank;
a first flow rate controller provided on said second water pathway; and
a controller which operates said first pump and controls said first flow rate controller so that the water flows through said second water pathway,
wherein said controller performs said control when said reformer is not performing an operation for generating hydrogen-containing gas.

2. The hydrogen generating apparatus according to claim 1, comprising:
a combustor which heats said reformer; and
a condenser which condenses moisture in combustion exhaust gas discharged from said combustor, wherein
said first water tank is a recovery water tank which stores water condensed in said condenser.

3. The hydrogen generating apparatus according to claim 1, comprising:
a purifier which purifies the water of said first water tank; and
a second water tank which stores water purified using said purifier, wherein
said first water pathway connects said second water tank to said reformer.

4. The hydrogen generating apparatus according to claim 3, comprising:
a second water level sensor which detects a water level of said second water tank; and
an abnormality detector which detects abnormality in said first pump based on a change in the water level detected using said second water level sensor during said control.

5. The hydrogen generating apparatus according to claim 1, comprising:
a second flow rate controller provided on said first water pathway and on the downstream side of said first pump, wherein
said controller operates said first pump and controls said first flow rate controller and said second flow rate controller so that the water delivered from said first pump flows into said second water pathway.

6. The hydrogen generating apparatus according to claim 5, wherein:
said first flow rate controller is a first valve,
said second flow rate controller is a second valve, and
said controller performs control to open said first valve and to close said second valve when an operation of said first pump is started.

7. The hydrogen generating apparatus according to claim 5, comprising:
a second water tank which stores the water flowing through said first water pathway;
a third water pathway through which water supplied from said first water tank to said second water tank flows;
a second pump provided on said third water pathway;
a heating device which heats at least one of pathways among said first water pathway on an upstream side of a branch section to said second water pathway, said second water pathway, said third water pathway, said first water tank and said second water tank; and
an external temperature detector which detects external temperature, wherein
said controller operates said heating device, said first pump and said second pump and controls said first flow rate controller and said second flow rate controller so that the water delivered from said first pump flows into said second water pathway to perform freezing prevention operation when said temperature detector has detected a temperature not more than a predetermined threshold value.

8. The hydrogen generating apparatus according to claim 7, wherein said heating device is a heater provided on a predetermined face of a housing accommodating at least said third water pathway, said first water tank and said second water tank to perform heating using radiation heat.

9. The hydrogen generating apparatus according to claim 1, wherein said controller performs said control during a start-up process.

10. The hydrogen generating apparatus according to claim 1, wherein said controller performs said control during a shutdown process.

11. The hydrogen generating apparatus according to claim 1, wherein said controller performs said control during a standby state.

12. The hydrogen generating apparatus according to claim 1, wherein said first flow rate controller is disposed above said first pump.

13. The hydrogen generating apparatus according to claim 1, comprising:
a first water level sensor which detects a water level of said first water tank; and
an abnormality detector which detects abnormality in said first pump based on a change in the water level detected using said first water level sensor during said control.

14. The hydrogen generating apparatus according to claim 1, wherein
said controller performs said control before supplying the water for the reforming reaction.

15. The hydrogen generating apparatus according to claim 1 wherein
said controller performs said control before the water is supplied to said reformer.

16. The hydrogen generation apparatus according to claim 1, wherein
said controller performs said control during a standby state.

17. The hydrogen generating apparatus according to claim 1, wherein
said controller performs said control during a shutdown process.

18. A fuel cell system comprising:
a hydrogen generating apparatus comprising:
a reformer which performs a reforming reaction using a material and steam to generate hydrogen-containing gas;
a water evaporator which generates said steam supplied to said reformer;
a first water pathway through which water to be supplied to said water evaporator flows;
a first pump which supplies the water to said water evaporator;
a second water pathway branching from said first water pathway on a downstream side of said first pump or branching from said first water pathway on which said first pump is disposed;
a first water tank, the water which flows through said second water pathway flows into the first water tank;
a first flow rate controller provided on said second water pathway; and
a controller which operates said first pump and controls said first flow rate controller so that the water flows through said second water pathway; and
a fuel cell which generates power using the hydrogen-containing gas supplied from said hydrogen generating apparatus,
wherein said controller performs said control when said reformer is not performing an operation for generating hydrogen-containing gas.

19. A method for controlling a hydrogen generating apparatus, wherein the apparatus comprises: a reformer which performs a reforming reaction using a material and steam to generate hydrogen-containing gas, a water evaporator which generates said steam supplied to said reformer, a first water pathway through which water to be supplied to said water evaporator flows, a first pump which supplies the water to said water evaporator, a second water pathway branching from said first water pathway on a downstream side of said first pump or branching from said first water pathway on which said first pump is disposed, a first water tank, where the water which flows through said second water pathway flows into the first water tank, a first valve provided on said second water pathway, and a second valve provided on said first water pathway, said method comprising:
    operating said first pump and performing control to open said first valve and to close said second valve so that the water delivered from said first pump flows into said second water pathway when said reformer is not performing an operation for generating hydrogen-containing gas.

\* \* \* \* \*